US006414967B2

(12) United States Patent
Van Grinsven et al.

(10) Patent No.: US 6,414,967 B2
(45) **Date of Patent: *Jul. 2, 2002**

(54) TRANSMISSION SYSTEM WITH FLEXIBLE FRAME STRUCTURE

(75) Inventors: Petrus A. M. Van Grinsven; Carel J. L. Van Driel, both of Eindhoven (NL)

(73) Assignee: Koninklijke Philips Electronics N.V., Einhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,037

(22) Filed: Oct. 15, 1997

(30) Foreign Application Priority Data

Oct. 22, 1996 (EP) .......................................... 96202902

(51) Int. Cl.$^{7}$ .............................. H04J 3/16; H04J 3/22; H04J 3/24

(52) U.S. Cl. ....................................... 370/466; 370/473

(58) Field of Search ................................ 370/353, 356, 370/389, 395, 397, 401, 410, 465, 466, 468, 474, 469; 371/473

(56) References Cited

U.S. PATENT DOCUMENTS

| | | | | |
|---|---|---|---|---|
| 5,570,355 A | * | 10/1996 | Dial et al. | 370/352 |
| 5,867,502 A | * | 2/1999 | Chang | 370/477 |
| 5,936,965 A | * | 8/1999 | Doshi et al. | 370/469 |
| 6,052,386 A | * | 4/2000 | Achilleoudis et al. | 370/470 |
| 6,084,888 A | * | 7/2000 | Watanabe et al. | 370/473 |
| 6,229,808 B1 | * | 5/2001 | Teich et al. | 370/398 |

OTHER PUBLICATIONS

Davic 1.1 (Digital Audio–Visual Council) Specification Part 08; Mar. 3, 1996 (Rev. 1.1) Lower Layer Protocols And Physical Interfaces.

* cited by examiner

*Primary Examiner*—Kwang Bin Yao
*Assistant Examiner*—Kevin C. Harper
(74) *Attorney, Agent, or Firm*—Daniel J. Piotrowski

(57) ABSTRACT

In a transmission system, a transmitter has a frame assembler which frames with a header and a payload portion. The header (22-1) comprises a validity indicator (SSSSS) to indicate the validity of a sequence of ATM cells in the frame. By using values of the validity indicator (SSSSS) different from the value of the validity indicator for valid ATM cells, it becomes possible to transport data in a format different from a sequence of ATM cells.

8 Claims, 4 Drawing Sheets

TRANSMISSION SYSTEM WITH FLEXIBLE FRAME STRUCTURE

BACKGROUND OF THE INVENTION

The invention is related to a transmission system comprising a transmitter being coupled to at least one receiver via a transmission medium, the transmitter comprising frame assembling means for assembling frames comprising a control portion and a sequence of ATM cells, the transmitter further comprises validity indication inserting means for inserting an validity indication in the control portion regarding the validity of the sequence of ATM cells, the receiver comprising frame disassembling means for extracting the ATM cells from the frames if the validity indication indicates valid ATM cells.

The invention is also related to a transmitter, a receiver, a transmission method and a signal.

A transmission system according to the present invention is known from DAVIC 1.1 Specification, Part 8, Revision 3.0.

In the DAVIC specifications (Digital Audio Video Council), it is tried to standardise a digital enhanced broadcast chain. These standards cover the complete chain from the content provider via the service provider to the end user. Aspects covered by DAVIC are e.g. video coding, security, channel coding, modulation and frame structures.

In DAVIC it is proposed to use MPEG-2 transport stream multiplex packets, in which the 187 bytes payload part carry a frame comprising a control portion and a sequence of ATM cells. The control portion can carry several items such as the priority of a packet, an error flag, an indication of the first frame of a multiframe sequence. It can also carry an indication that the current sequence of ATM cells carried in the frame has to be discarded at the receiver because the ATM cells are introduced as stuff information to fill the transmission channel.

A problem of the known system is that it is not suitable for transporting data in other formats than ATM cells. Such formats can e.g. be STM, which requires fixed length data words having a repetition rate of 125 $\mu$s, or variable length data formats such as Ethernet packets or IP (Internet Protocol) packets.

SUMMARY OF THE INVENTION

The object of the present invention is to provide a transmission system according to the preamble which allows the transport of various types of data formats, without loosing the possibility of transporting ATM packets as described above.

Therefor the transmission system according to the present invention is characterised in that the frame assembling means are also arranged for inserting data different from a sequence of ATM cells into the frame, in that the validity indication insertion means are arranged for introducing an identification of the data different from a sequence of ATM cells by a different value of the validity indicator, and in that the frame disassembling means are arranged for extracting the data different from a sequence of ATM cells from the frames, if the validity indicator indicates data different from a sequence of ATM cells.

The present invention is based on the idea that it is possible to use the validity indication which is used for indicating the validity of the present sequence of ATM cells to indicate other types of data formats. By doing so, the transport of ATM cells according to the prior art is not affected at all, but only the possibility to add other types of data formats is created. In the DAVIC standard the control portion comprises 5 bits “11110” indicating the validity of the ATM cells. Consequently other values of these 5 bits can be used for indicating other data formats.

An embodiment of the present invention is characterised in that the data different from a sequence of ATM cells comprises packets with an identification portion indicating of at least one property of said packets.

By specifying at least one property of a cell in an identification portion, it is obtained that such cells easily can be identified and processed accordingly.

A further embodiment of the invention is characterised in that the at least one property comprises the length of the packet and in that the frame comprises a data portion indicating the position of the beginning of a new packet in the frame.

By specifying the length of each packet in the frame, and by specifying the beginning of one packet in the frame, the position of each packet in the frame can easily be determined. This allows an easy extraction of the packets from the frame.

A further embodiment of the invention is characterised in that the length of the packet is an integer multiple of an elementary data unit larger than one byte.

By introducing these elementary data units, the length of the packets can have only a restricted number of values, reducing the number of bits required to encode the length of the packets.

BRIEF DESCRIPTION OF THE DRAWINGS

The present invention will now be explained with reference to the drawings. Herein shows.

DESCRIPTION OF THE PREFERRED EMBODIMENTS

Figure 1:
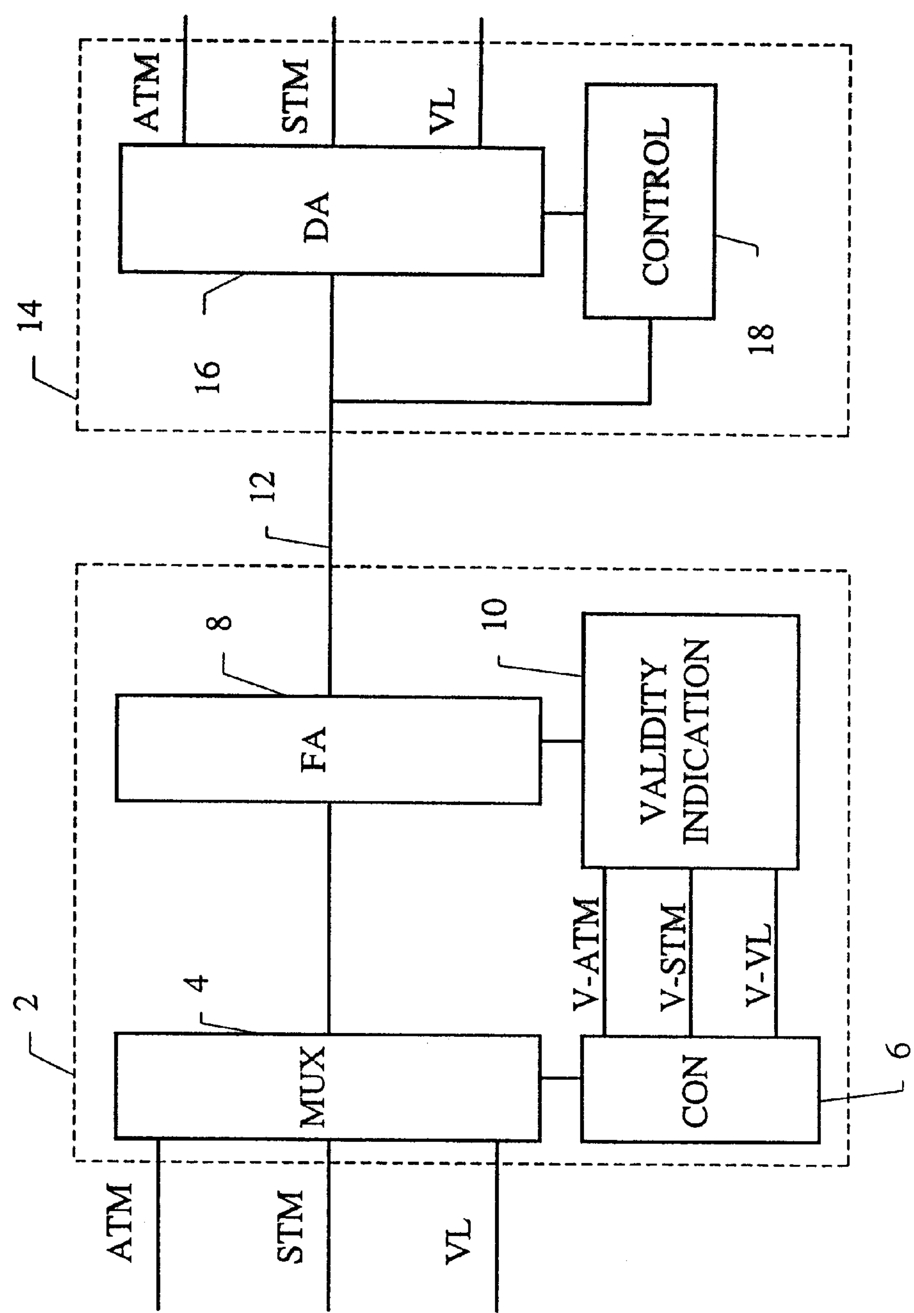
FIG. 1, a transmission system according to the invention.

In the transmission system according to FIG. 1, an ATM signal is applied to a first input of a multiplexer 4 in a transmitter 2. An STM signal is applied to a second input of the multiplexer 4, and a sequence of variable length cells is applied to a third input of the multiplexer 4. A first output of a controller 6 is connected to a control input of the multiplexer 4. An output of the multiplexer 4 is connected to an input of the frame assembling means further to be referred to as frame assembler 8.

A second output signal of the controller 6, carrying an output signal V-ATM, is connected to a first input of the validity indication inserting means, further to be referred to as validity indication inserter 10. A third output of the controller 6, carrying an output signal V-STM, is connected to a second input of the validity indication inserter 10. A fourth output of the controller 6, carrying an output signal V-VL, is connected to a third input of the validity indication inserter 10.

An output of the validity indication inserter 10 is connected to a second input of the frame assembler 8. The output of the frame assembler 8 is coupled to the output of the transmitter 2.

The output of the transmitter 2 is coupled to the input of a receiver 14 via a transmission medium 12. The input of the receiver 14 is connected to an input of a controller 18, and to an input of the frame disassembling means, being here a frame disassembler 16. An output of the controller 18 is connected to a second input of the frame disassembler 16. At a first output of the frame disassembler 16 an output signal in ATM format is available. At a second output of the frame disassembler 16 an output signal in STM format is available, and at a third output of the frame disassembler 16 an output signal comprising variable length packets is available.

The transmission system according to FIG. 1 is arranged for transmitting data in ATM format and STM format. It also supports the transmission of variable length packets such as Ethernet packets or TCP/IP packets. Elementary units of the different types of data are packed in so-called Protocol Data Units (PDU's).

The controller 6 submits to the multiplexer 4 a control signal indicating which of its input signals is to be passed to the output of the multiplexer 4. The combination of the controller 6 and the multiplexer 4 are arranged to change the selection of the source rapidly, introducing the possibility of generating an output stream in which ATM cells, STM data and variable length packets are interleaved.

The controller 6 provides information about the validity of the signals at the inputs of the multiplexer, in order to enable the validity indication inserter 10 to introduce a validity indication in the frame to be constructed by the frame assembler 8. By using the validity indication the receiver is enabled to distinguish idle packets from packets carrying payload data. By using an identification other than already prescribed in the DAVIC specification, it becomes possible to identify other types of data formats.

The frame assembler 8 constructs frames comprising the output data of the multiplexer 4 and the validity indication. The frames of data are transmitted to the receiver 12 via the transmission medium 12.

In the receiver 14, the controller determines the beginning of a frame, and it determines from the validity indication whether the input signal carries a stream of ATM cells or that the input signal carries a different type of signal. This information is used to control the disassembler 16 which extracts the different data formats from the frame and outputs them at corresponding outputs of the receiver 14. It is observed that it is possible that a receiver is arranged for only receiving one type of data. In such a case only a signal is present at the output of the received if said type of data is present in the frame at the input of the receiver 14.

Figure 2:
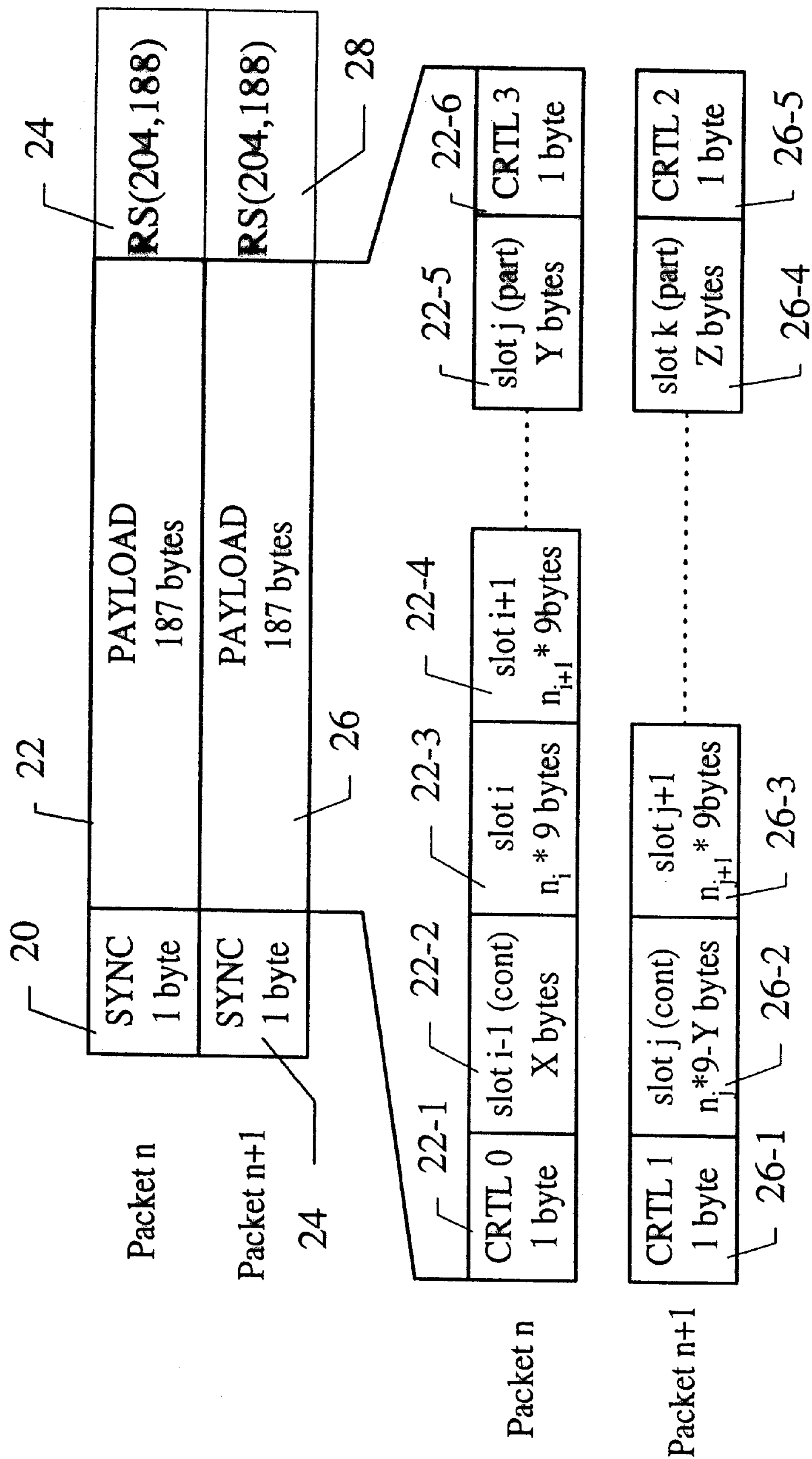
FIG. 2, the constitution of a basic frame consisting of two MPEG transport stream frames.

The signal according to FIG. 2 comprises a sequence of 2 standard MPEG transport multiplex packets. A frame according to the present invention is carried by the 187 payload bytes of two subsequent MPEG transport stream packets. The first of these MPEG transport multiplex packets comprises a synchronization signal 20 of one byte, the payload 22 of 187 bytes and an error control portion 24 of sixteen bytes. The second of these MPEG transport multiplex packets comprises a synchronization signal 24 of one byte, the payload 26 of 187 bytes and an error control portion 28 of sixteen bytes. The synchronization signal is a fixed 8 bit field with binary value "01000111", and it is used for frame synchronization. The frame comprises four control bytes 22-1 (CTRL0), 26-1 (CTRL1), 26-5 (CTRL2) and 22-6 (CTRL3) , and a plurality of elementary data units 22-2●●●●22-5, 26-2●●●●26-5 also call slots, to carry the user data. These slots comprise an integer multiple of bytes. It is not necessary that after the CTRL0 byte a new slot starts, but it is possible that a slot from a previous frame is continued. This leads to an increased efficiency of the frame, because no unused space is present in the frame. The CTRL0 byte indicates that the present packet is the first of the sequence of two MPEG transport stream packets. The value of CRTL0 is E1PSSSSSb where the E, P, and S bits are defined below. The CTRL1 byte indicates that the current packet is the second of a two packet sequence. Its value is E0PSSSSSb where E, P, and S bits are defined below.

The E bit is a 1 bit error flag. When set to "1", it indicates that at least 1 uncorrectable bit error exists in the associated 187 byte payload. This bit may be set to "1" by entities in the transport layer. When set to "1", this bit shall not be reset to "0" unless the bit value(s) in error have been corrected. The P bit is a 1 bit priority flag. When set to "1", it indicates that the associated packet has a higher priority than the payload of which the priority flag is set to "0".

The 5 bit SSSSS field is the validity indicator. If its value is equal to binary "11110" it means that a valid stream of ATM cells according the DAVIC standard is within the payload. In such a case no slots are used. The first MPEG transport stream packet comprises 3 ATM cells of 53 bytes and 27 bytes of a fourth ATM cell. The second MPEG transport stream packet comprises the 26 remaining bytes of the fourth packet and 3 further ATM cells. In this case the CTRL3 byte is not present.

If the string SSSSS has another value e.g. "01011", it means that a signal differing from the above mentioned ATM stream is present within the payload 22 and 26. It is possible to indicate with the string SSSSS which type of signal is within the payload, but it is also possible to indicate with the string SSSSS only that the payload carries a different format than the DAVIC ATM stream. The latter opens the possibility that different types of data are interleaved within the payload. In such a case, this data has to carry identification information itself.

The CTRL2 byte is reserved. It will be defined for carriage of Operation, Administration, and Maintenance information (OAM).

The CTRL3 byte indicates the position of the first byte of a new Protocol Data Unit (PDU) in the second MPEG transport packet. Each new PDU starts wit a new timeslot. By using this information, the disassembler 16 can easily extract the PDU from the frame.

Figure 3:
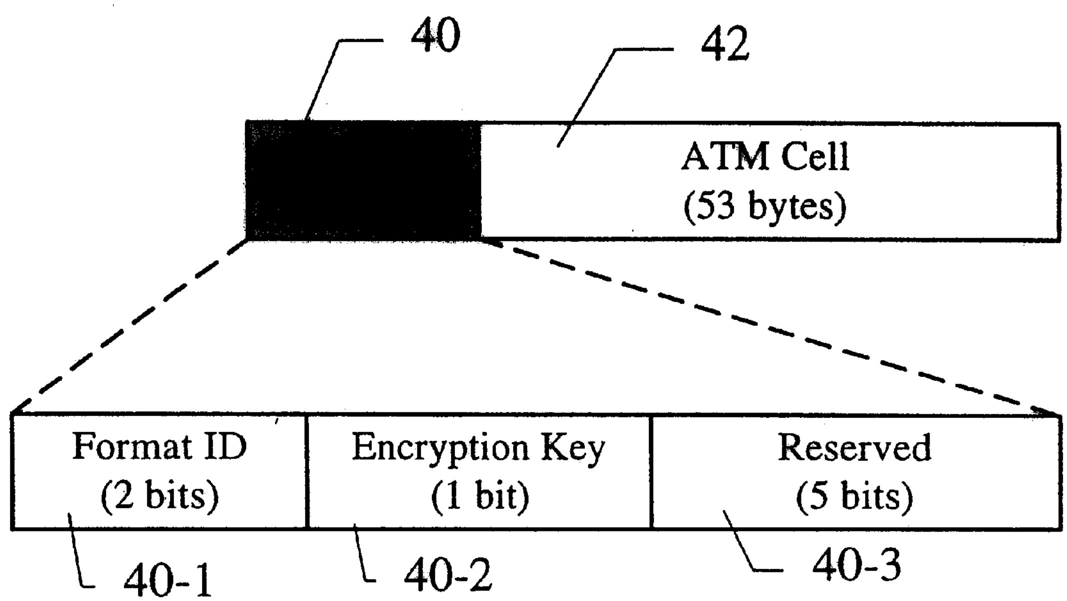
FIG. 3, a packet comprising an ATM cell with an identifier byte according to the IEEE802.14 proposal.

FIG. 3 shows a first type of PDU being a sequence of ATM cells according to a draft for the (not yet announced) IEEE 802.14 standard. This sequence differs from the standardised DAVIC sequence of ATM cells by an identification portion being here a one byte identifier 40 preceding each ATM cell. The identifier byte 40 has three fields being defined according to the table below:

| Field | Usage | Size |
|---|---|---|
| Format ID | Type of PDU (set = 00) | 2 bit |
| Encryption Key | Even/Odd Encryption key identifier | 1 bit |
| Reserved | Reserved for expansion of Format ID (set = 0) | 5 bits |

The format ID 40-1 field indicated the type of PDU. This field is present in all PDU's. For the ATM PDU these bits are set to "00". The encryption key identifier bit 40-2 is used for indicating a switch between two sets of encryption keys in order to increase security. The portion 40-3 comprising the final 5 bits of the identifier 40 are reserved for introducing future format ID's.

Figure 4:
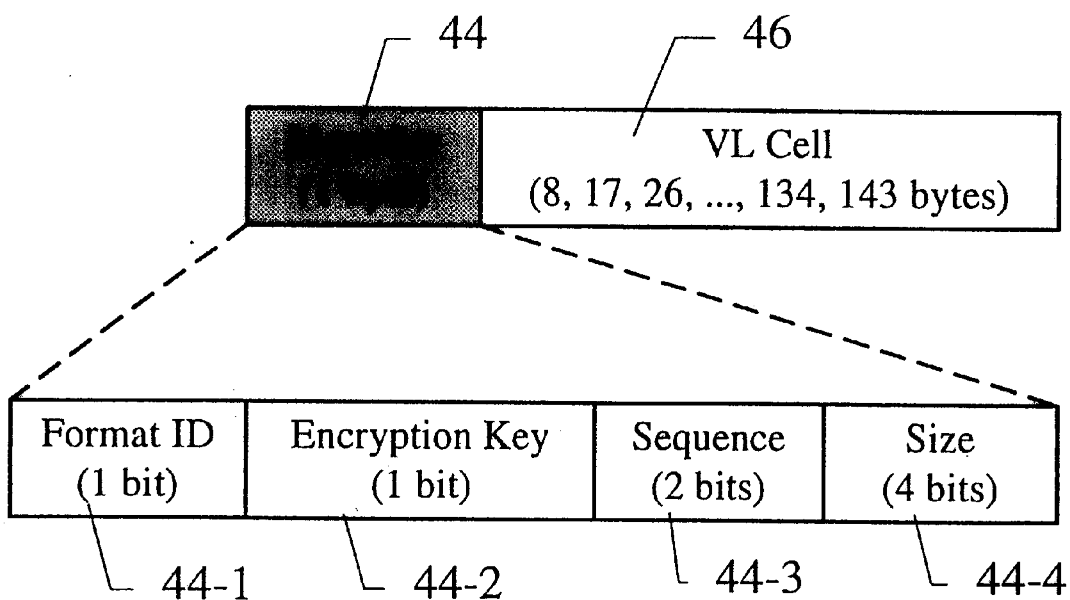
FIG. 4, a packet comprising a variable length cell.

FIG. 4 shows a second type of PDU being a variable length cell PDU. This type of cell has a identifier 44 with four fields. The fields have the meaning according to the following table.

| Field | Usage | Size |
|---|---|---|
| Format ID | Type of PDU (set = 1) | 1 bit |
| Encryption Key | Even/Odd Encryption key identifier | 1 bit |
| Sequence | Sequence identifier for fragmentation/ reassembly<br>10 = First data fragment<br>00 = Fragment within a VL cell<br>01 = Last data fragment<br>11 = Start and end of VL cell are both within this fragment. | 2 bits |
| Size | Number of slots that follow for the same fragment | 4 bits |

The format ID field 44-1 is a bit indicating the type of PDU. It is set to the value "1". The encryption key identifier 44-2 has the same meaning as already discussed in reference with FIG. 3. The sequence identifier 44-3 is present to deal with variable length data units larger than 143 bytes. If the sequence identifier 44-3 has the binary value "10", it means that the current fragment is the first fragment from a larger VL cell. If the sequence identifier 44-3 has the binary value "00", it means that the current fragment is a fragment within the VL cell and that at least one fragment will follow. If the sequence identifier 44-2 has the binary value "01", it means that the current fragment is the final segment of the VL cell. If the sequence identifier 44-3 has the binary value "11", it means that the current fragment is the only fragment of the VL cell. The sequence field is used to extract the complete VL packet from a plurality of VL PDU's. The size identifier 44-4 consists of four bits representing the number of 9 bytes slots that follow for the same PDU.

Figure 5:
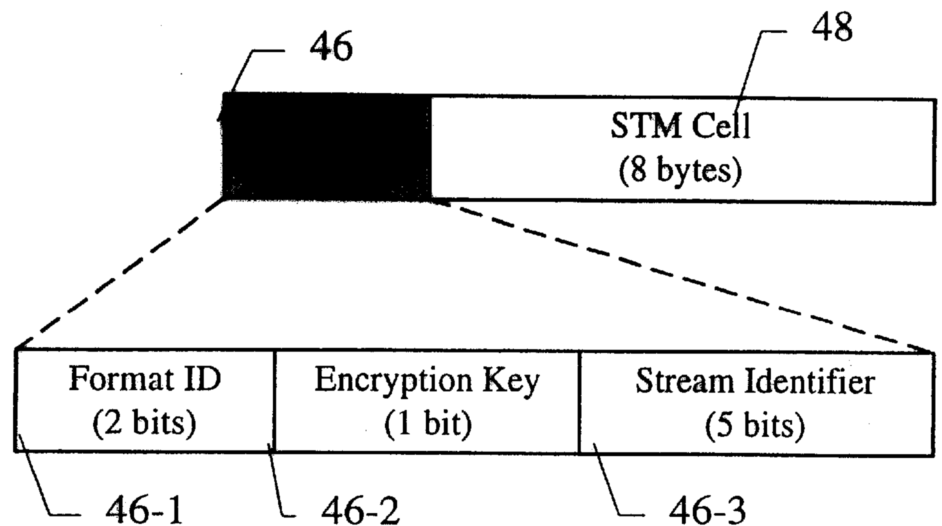
FIG. 5, a packet comprising an STM cell.

FIG. 5 shows a third type of PDU being intended for carrying STM data. STM is used to support fixed bit rate 64 Kbps connection, often intended for telephony or ISDN applications. The STM PDU comprises a one byte header 46, and an 8 byte STM cell 48. Consequently the STM PDU fills exactly one slot. The header 46 comprises three fields 46-1, 46-2 and 46-3 according to the table below.

| Field | Usage | Size |
|---|---|---|
| Format ID | Type of PDU (set = 01) | 2 bit |
| Encryption Key | Even/Odd Encryption key identifier | 1 bit |
| Stream Identifier | STM stream identifier. The NT can filter the incoming S_PDUs on value of this field. Each stream contains data of up to 8 calls. | 5 bits |

The format ID 46-1 with a value of "01" indicates the presence of an STM PDU. There are various options to implement STM in the downstream.

A first way of transporting the STM data is to use PDUs with the size of a single slot. Again the header byte contains the cell type information, being a cell type identifier and an STM Stream Identifier. A single byte per slot per 64 kbps connection will be allocated, where the slots are scheduled 125 Ts apart from each other. In case only one 64 kbps connection is active, this would create an overhead of 7 bytes per 125 Ts in a 30 Mbps stream which is about 1.5%. This method supports addressing of up to 256 simultaneous active calls per downstream carrier.

An alternative way to transport STM which is used in the PDU according to FIG. 5, is to introduce a stream identifier of 5 bits for identifying the actual STM stream for which the data in the STM cell is intended. Due to the size of the stream identifier, the number of simultaneous active calls is 32. The STM cells comprises 8 subsequent bytes from one STM stream. This leads to an additional delay of 8×125 $\mu$s=1 ms, due to the buffering of 8 bytes from the ATM stream.

Figure 6:
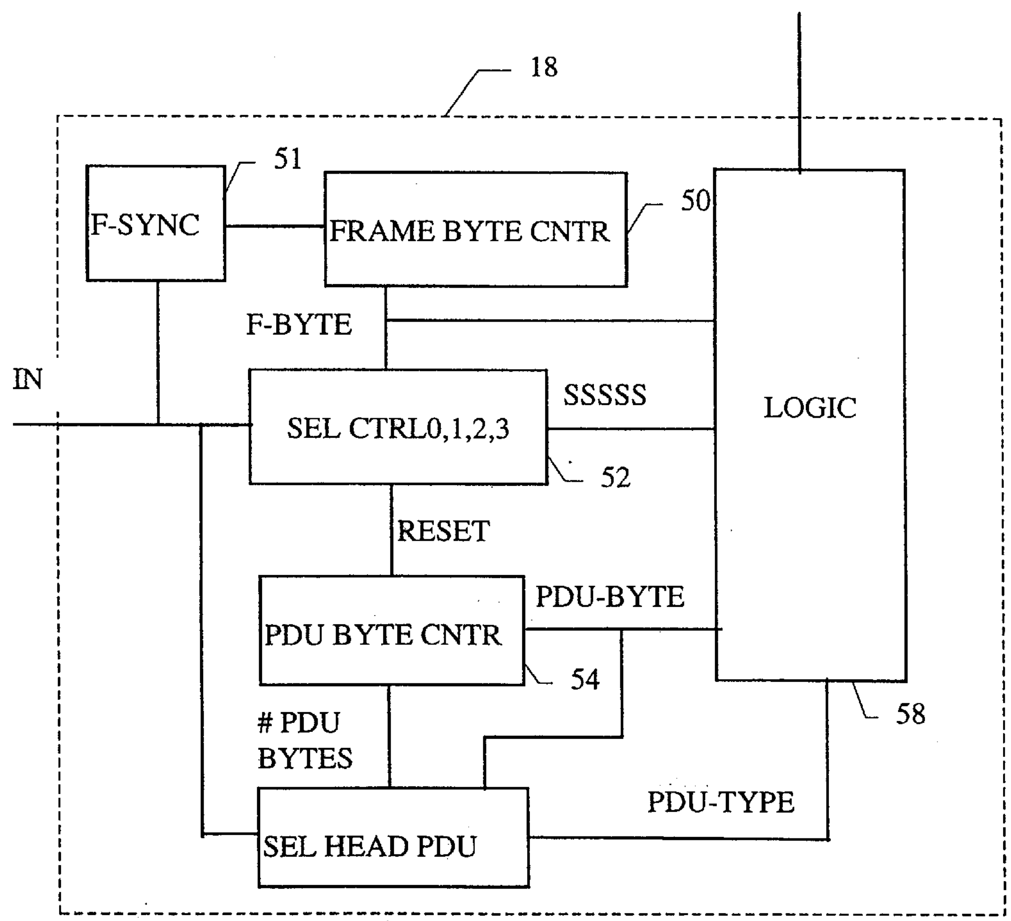
FIG. 6, a block diagram of the controller 18 for a frame structure being able to carry the data formats according to FIG. 3, FIG. 4 and FIG. 5.

In the control unit 18 according to FIG. 6, the input is connected to an input of a frame synchronizer 51, to a control byte selector 52 and to a PDU header selector 56. An output of the frame synchronizer 51 is connected to an input of a reset input of a frame byte counter 50. An output of the frame byte counter 50, carrying the number of the present byte in the frame, is connected to an input of a logic unit 58 and to an input of the control byte selector 52.

A first output of the control byte selector 52, carrying the validity indicator SSSSS for the ATM cells is connected to the logic unit 58. A second output of the control byte selector 52, carrying a reset signal, is connected to a PDU-byte counter 54. An output of the PDU-byte counter 54, carrying the number of the present byte in the present PDU, is connected to the logic unit 58 and to the PDU header selector 56. A first output of the PDU header selector, carrying the number of bytes in the present PDU is connected to an input of the PDU-byte counter 54. A second output of the PDU header selector 56, carrying a signal representing the type of the present PDU, is connected to the logic unit 58. The output of the logic unit 58 constitutes the output of the controller 18.

The frame byte counter 50 is a counter being able to count from 0 to 186. It outputs the number of the current byte in the frame. The frame synchronizer 51 determined the beginning of each frame of 187 bytes. The frame synchronizer 51 issues at the beginning of each frame a reset pulse to the frame byte counter 50 to reset it. This causes the frame byte counter to be synchronized with the frame at the input of the control unit 18.

The control byte selector 52 is arranged for extracting the control bytes CRTL 0, CTRL 1, CTRL 2 and CTRL 3 from the input stream. The control byte selector 52 is arranged to select the bytes at the input as control bytes ifs the frame byte counter 50 has the value 0 or the value 156. If the first bit in a control byte found at a position 0 of the frame byte counter has a value "1", said control byte is a CTRL 0 byte. Its value is stored, and the value of the bits SSSSS is passed to the logic unit 58. If the sequence SSSSS is equal to "11110", the frame comprises a sequence of ATM cells according to the DAVIC standard, and the logic unit 58 issues a command to the frame disassembler 16 (FIG. 1) to pass all payload to the ATM output. If the sequence differs from "11110", the frames comprises PDU based data.

The control byte present at the position 186 of the frame byte counter 50 can be a CTRL 2 or CTRL 3 byte. If the control byte in the same frame at position 0 of the frame byte counter 50 was a CTRL 0 byte, the byte at position 186 in a CTRL 3 byte. Otherwise the byte at position 186 is a CTRL 2 byte.

In the case a CTRL 3 byte is present, its content indicating the byte number on which the first new PDU in the next frame (or part of the frame) starts, is stored for later use.

The PDU byte counter 54 is arranged for counting PDU bytes. It is arranged as a down counter which starts from a preset value and it counts down to 0. The PDU byte counter 54 is decremented only if a PDU byte is present in the payload. It is not decremented during the presence of CTRL 0, CTRL 1, CTRL 2 or CTRL 3 bytes. The PDU byte counter is reset to "0" by the control byte selector 52 if the value of the frame byte counter corresponds to the value of the previous CTRL 3 byte. This reset indicates the beginning of a new PDU. The PDU header selector 56 selects from the input signal the present byte if the PDU byte counter 54 has a value "0". The PDU header selector determines the type of PDU and the length of the PDU from the information present in the header.

An ATM cell PDU can be recognised by the value "00" of the first two bits of the PDU header. The length of such an ATM PDU is 54 bytes. The cell type is passed to the logic unit 58, enabling to route the input signal via the disassembler 16 (FIG. 1) to the ATM output. The logic unit 58 is arranged for presenting a read command to the disassembler 16 only if the value of the PDU counter has changed and the value of the PDU byte counter is not equal to 0. This is done to prevent the CRTL bytes and the PDU header being passed to one of the outputs of the receiver. If a CRTL byte is at the input, the PDU byte counter is not advanced, and consequently the CRTL byte is not passed to the output of the receiver. If a PDU header is present at the input, the PDU byte counter has a value of 0, and hence the PDU header is not passed to the output of the receiver. The number of PDU bytes after the first PDU byte (#PDU bytes) is 53. This number is loaded in the programmable PDU byte counter 54. The PDU byte counter is decremented each time a byte of data is read from the input. The PDU byte counter will have the value zero after 53 bytes have been read from the input. Subsequently the PDU header selector reads the header of the next PDU.

A VL PDU can be recognised by the value "1" of the first bit in the PDU header. The number of PDU bytes (#PDU) after the first PDU byte is determined from the length indicator L represented by the four last bits of the PDU header according to: #PDU bytes=8+L*9. The type of PDU is also passed to the logic unit 58.

An STM PDU can be recognised by the value "01" of the first two bytes of the PDU header. The length of such a PDU (including header) is 9 bytes, resulting in a value of 8 for #PDU bytes. The type of PDU and the stream identifier are passed to the disassembler 16. The latter is used to identify the STM stream the bytes in the present PDU belong to. This information is used for routing the STM signals correctly to their final destination.

What is claimed is:

1. A transmission system comprising:

a transmitter; and at least one receiver coupled via a transmission medium to the transmitter, the transmitter comprising:

a frame assembler to assemble frames within a payload portion of a packet, the frames comprising a control portion and a sequence of data cells configured to transmit ATM cells; and a validity indication inserter to insert a validity indication in the control portion, set to a first value when there are only valid ATM cells in the sequence of data cells, and set to at least a second value when there are data cells different from ATM cells in the sequence of data cells, the receiver comprising:

a frame disassembler to extract ATM cells from the frames if the validity indication indicates valid ATM cells, and for extracting the different data cells from the frames, if the validity indicator indicates data different from a sequence of ATM cells.

2. The transmission system of claim 1, wherein the data different from a sequence of ATM cells comprises packets with an identification portion indicating at least one property of said packets.

3. The transmission system of claim 2, wherein said at least one property comprises the length of the packet and where the frame comprises a data portion indicating the position of the beginning of a new packet in the frame.

4. The transmission system of claim 3, wherein the length of the packet is an integer multiple of an elementary data unit larger than one byte.

5. A transmitter comprising:

a frame assembler to assemble frames within a payload portion of a packet, the frames comprising a control portion and a sequence of data cells configured to transmit ATM cells; and a validity indication inserter to insert a validity indication in the control portion, set to a first value, when there are only valid ATM cells in the sequence of data cells, and set to at least a second value when there are data cells different from ATM cells in the sequence of data cells.

6. The transmitter of claim 5, wherein the data different from a sequence of ATM cells comprises packets with an identification portion indicative of at least one property of said packets.

7. A receiver comprising:

a unit for receiving frames within a payload portion of a packet, the frames comprising a control portion and a sequence of data cells, configured to transmit ATM cells, said control portion comprising a validity indication, set to a first value, when there are only valid ATM cells in the sequence of data cells and set to at least a second value when there are data cells different from ATM cells in the sequence of data cells; and a frame disassembler for extracting ATM cells from the frames if the validity indication indicates valid ATM cells, and for extracting data different from a sequence of ATM cells from the frames, if the validity indication indicates data different from a sequence of ATM cells.

8. The receiver of claim 7, wherein the data different from a sequence of ATM cells comprises packets with an identification portion indicating of at least one property of said packets.

* * * * *